United States Patent

[11] 3,563,495

| [72] | Inventor | Bernard B. Korn |
| | | West Los Angeles, Calif. |
| [21] | Appl. No. | 795,798 |
| [22] | Filed | Feb. 3, 1969 |
| [45] | Patented | Feb. 16, 1971 |
| [73] | Assignee | the United States of America as represented by the Secretary of the Air Force |

[54] POWER OPERATED FOLDING WING FOR ROCKETS AND MISSILES
3 Claims, 4 Drawing Figs.

[52] U.S. Cl. .................................................. 244/3.29
[51] Int. Cl. .................................................. F42b 13/22
[50] Field of Search .................................. 244/3.27, 3.29

[56] References Cited
UNITED STATES PATENTS

| 2,977,880 | 4/1961 | Kershner | 244/3.29 |
| 3,188,958 | 6/1965 | Burke et al. | 244/3.29X |
| 3,273,500 | 9/1966 | Kongelbeck | 244/3.28 |

*Primary Examiner*—Verlin R. Pendegrass
*Attorneys*—Harry A. Herbert, Jr. and Henry S. Miller, Jr.

ABSTRACT: A power operated folding wing including a hinged wing mounted on a rocket or missile, a slidable cylindrically shaped member having grooves therein and mating projections in the rocket and a cam with accelerating and decelerating slopes. Pneumatic or hydraulic means mounted at the end of the cylinder to cause it to slide and cam followers fixed to the wing riding on the cam to cause the wing to extend or collapse.

PATENTED FEB 16 1971
3,563,495
SHEET 1 OF 2
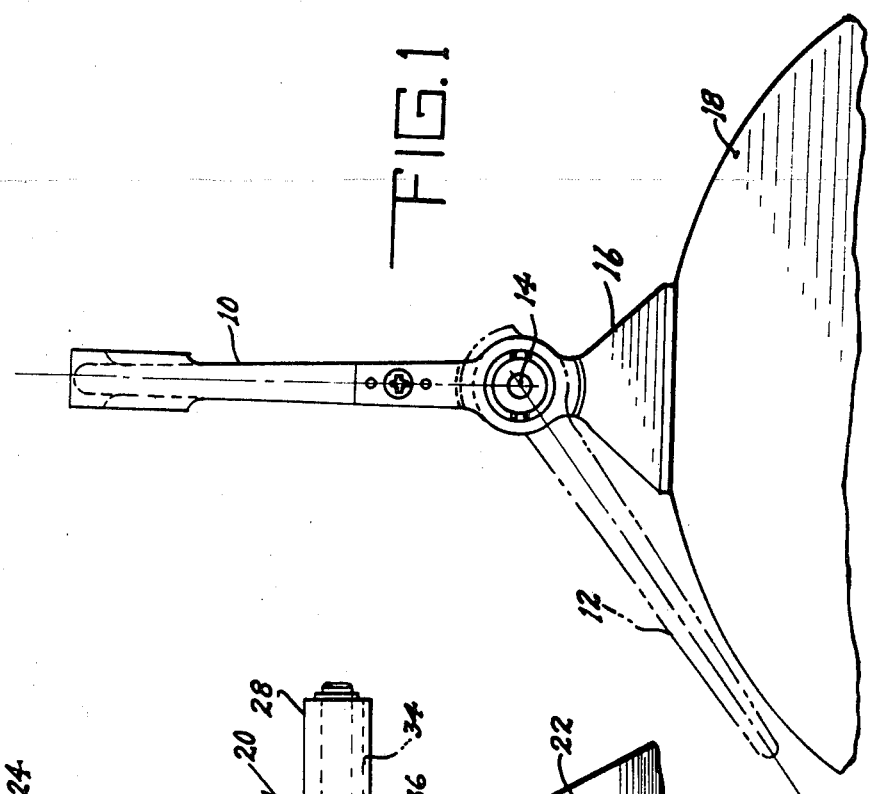
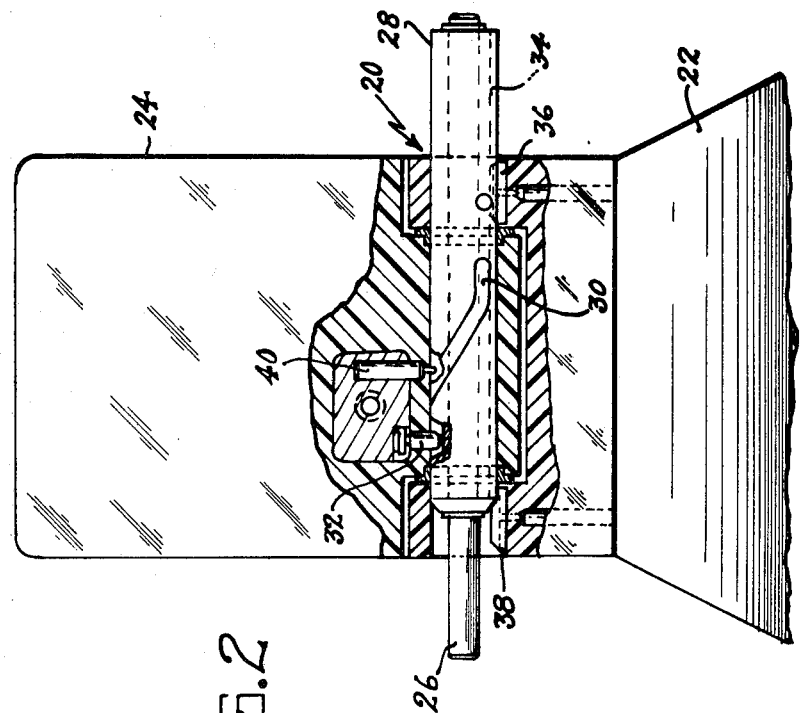
INVENTOR.
BERNARD B. KORN

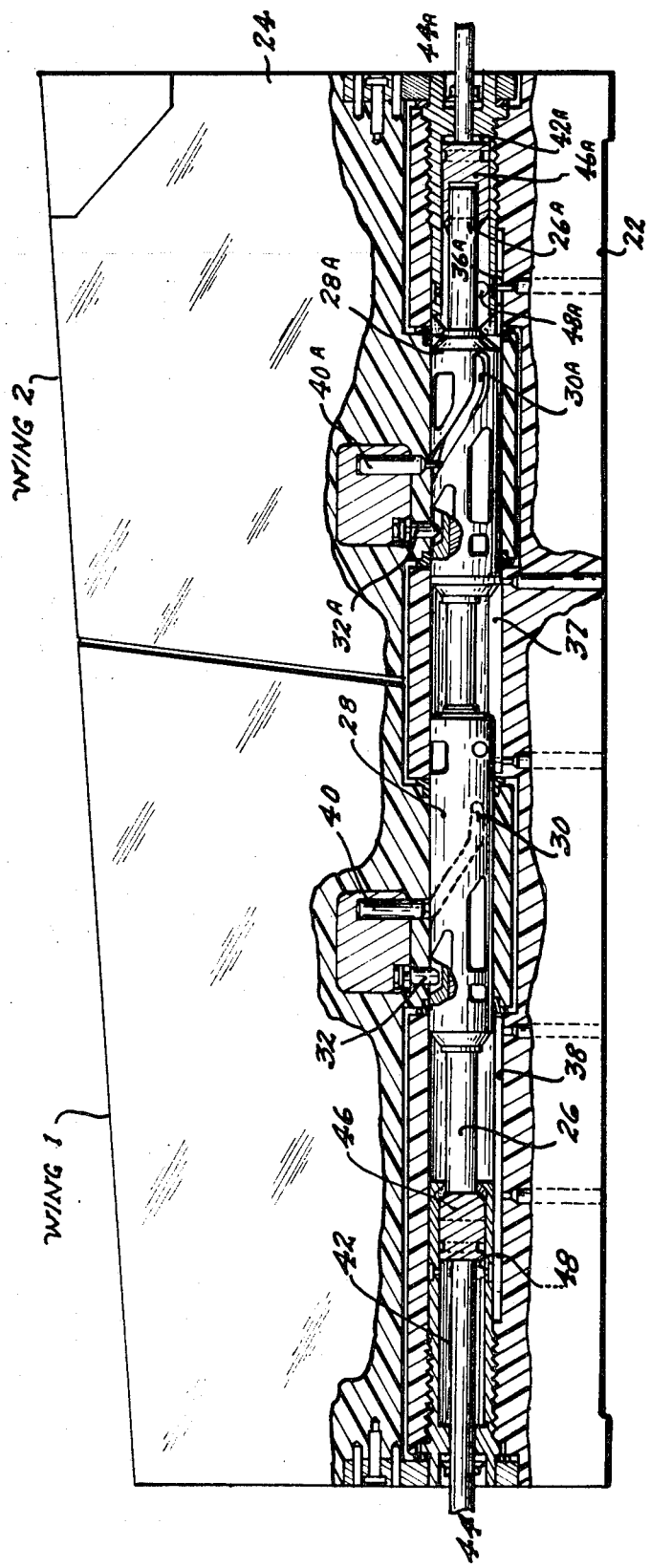
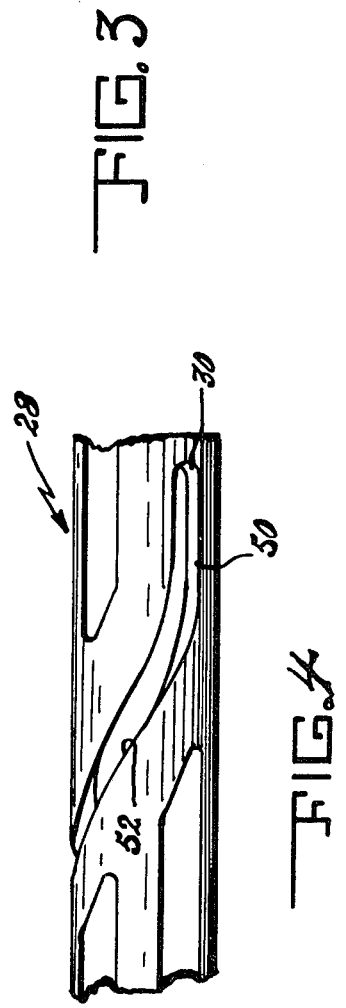

ically small aircraft, lowered into the airstream where the wings are extended and fired, while at the same time if the firing is aborted the wings could be retracted and the missile returned to the bomb bay.

SUMMARY OF THE INVENTION

The instant invention provides a foldable wing which may be used with a high degree of reliability on both missiles and rockets while requiring a minimum of maintenance and storage space. The invention consists of a hingelike member mounted on the outside surface of the device it is to be used on. Due to the various forces working on the wing which is attached to the hingelike member, it may be necessary to reinforce the mounting member by structure beneath the surface. Matching and mating members are located on the wing forming a piano-type hinge with the base member. Running through both the base and wing in the same manner as a pin in a piano hinge is a cylindrically-shaped member which slides longitudinally in the hingelike configuration. The member is keyed where it slides through the base member, thus preventing relative rotation of the cylinder. In the wing adjacent to the cylinder is a cam follower which rides in a cam groove in the cylinder. As a result, when a force is applied to one end of the cylinder, it slides longitudinally but does not rotate, the cam follower riding in the groove causes the wing to move into position where a suitable locking means will secure it. Alternatively, the wing may be made of a section which folds in opposite directions, the advantages of this being that when the sections move into position, their inertial forces will cancel each other out, thereby avoiding the possibility of a misdirected missile due to this unbalanced force. In order to accomplish this, it is necessary to have the grooves and cams oppositely directed from each other.

It is, therefore, an object of this invention to provide a new and novel means for positioning the folded wings of a rocket or missile.

It is a further object of this invention to provide a new and improved means for positioning the folded wings or fins of rockets and missiles which are subdivided and fold in opposite directions.

It is another object of this invention to provide means for unfolding the wing or fin of a missile which causes it to move without excessive vibration or shock.

It is still another object of this invention to provide a wing positioning system which will operate automatically.

It is still a further object of this invention to provide a wing positioning system which may be operated from an area remote from the missile or rocket.

It is another object of this invention to provide a novel fin erecting mechanism for rockets and missiles which may be operated by compressed air, hydraulic pressure, squibs or gas generator without any changes in internal construction.

It is another object of the invention to provide a novel fin erecting mechanism which is economical to produce and utilizes conventional, currently available components that lend themselves to standard mass production manufacturing techniques.

DESCRIPTION OF THE DRAWINGS

FIG. 1 is an end view of the fin and erector assembly in the elevated position;

FIG. 2 is a side elevation view partly in section of the wing in the extended position;

FIG. 3 is a side view partly in section of the mechanism of this invention; and

FIG. 4 is a side elevational view of the cam showing an acceleration and deceleration slope.

DESCRIPTION OF THE PREFERRED EMBODIMENT

Referring now to the drawings, in FIG. 1 there is shown an end view of the folded wing assembly. The wing in the flight position is seen at 10, while the folded or storage position is at 12. The wing pivots about a central shaft 14 which is supported on either end by the base 16 which is in turn securely fastened to the missile's outer surface 18.

In FIG. 2, the wing moving assembly is generally represented by 20 and is slidingly mounted in the base member 22, while the folding wing 24 is rotatably mounted on the base 22 around the moving assembly. The wing moving assembly consists of central shaft 26 which passes through the center of the sleeve 28 and is secured thereto. The ends of the central shaft are connected to power sources as will be explained in connection with FIG. 3. The sleeve 28 has a cam or track 30 in which rides a cam follower 32. The follower is fixed to and extends from the folding wing 24. At the bottom of the sleeve 28 is a keyway 34 which runs the entire length of the sleeve and parallel to its longitudinal axis. Two keys 36 and 38 are fixed to the base 22 and ride in the keyway 34. By these means the sleeve is prevented from making any rotational movement as it moves from left to right or right to left as shown in the drawing. Instead, as power is applied to one end of the central shaft, the sleeve moves in the appropriate direction with the cam follower 32 following the cam 30, causing the wing to either raise or lower depending upon the direction of travel of the cam. A mechanical spring plunger 40 mounted in the wing rests in a specially shaped detent in the cam when the wing is in the raised position. The spring plunger resists any longitudinal movement of the cam which may be caused by vibration of the rocket motors, or other reasons.

Concerning FIG. 3, there is shown a pair of wing moving assemblies. It should be noted that the moving assemblies may be attached one to another for the entire length of the missile, if so desired, the limiting feature being the power supply to cause movement of the wing. The numerical designation of similar items in FIG. 3 are the same as those in FIG. 2, except the second wing movement assembly designations have the suffix "A" added thereto. The key 36 of FIG. 2 has been replaced in FIG. 3 by an enlarged key 37 which takes the place of key 36, and proposed key 38A, and serves both wing moving assemblies. The wing moving assembly in this case is powered by a compressed gas which may be stored in the form of an explosive cap. The cap (not shown) would be fixed in the end of the combustion chamber 42 and 42A. When one of the caps is ignited, it liberates gases which push against either piston 46 and 46A which is attached to the center shaft 26. As the center shaft moves because of the expanding gases it imparts motion to the cams 28 and 28A, causing the wings to move into position. The cam is designed to have an acceleration slope and a deceleration slope thereby preventing the wings from being broken off by inertial forces as they reach their rest position. A novel feature of this device is that as the piston on one side, for example as piston 46 moves under the pressure exerted upon it, piston 46A passes its exhaust vent and compresses the gas in the chamber and in doing so acts as a shock absorber, thus avoiding the possibility of breaking parts during operation.

It is additionally possible to provide a folding wing wherein sections of the wing fold in opposite directions. In this arrangement the cams would be oppositely directed on the sleeve 28. Such an arrangement would make it possible to balance out the inertial forces.

In FIG. 4 an enlarged section of the sleeve 28 is shown. The cam or track 30 has a deceleration slope 50 and acceleration slope 52. As the cam follower rides on the cam the wing moves rapidly over the acceleration slope. The movement of the wing is slowed down as the cam reaches the deceleration slope thereby permitting the wing to come to rest relatively gently.

I claim:

1. A system for extending and retracting folding wings on rockets comprising: a base means secured to the outer surface of a rocket, a movable control surface attached to the base and rotatable through an arc of at least 90′; means for rotating the control surface including a sleeve slidably mounted in the base and having means to prevent the relative rotation thereof, and a cam surface located therein and cam follower means extending from the control surface for riding on said cam; and means for actuating said sleeve including a piston means operatively connected to the sleeve and means for driving the piston.

2. A system for extending and retracting folding wings on rockets according to claim 1 wherein the means for driving the piston comprises: high pressure fluid.

3. A system for extending and retracting folding wings on rockets according to claim 1 where the means for driving the piston comprises: high pressure gas.